United States Patent
Wu et al.

(10) Patent No.: US 8,212,980 B2
(45) Date of Patent: Jul. 3, 2012

(54) LIQUID CRYSTAL DISPLAY AND ACTIVE MATRIX SUBSTRATE

(75) Inventors: Ming-Chou Wu, Nantou County (TW); Hsin-Hua Pan, Taipei (TW)

(73) Assignee: Au Optronics Corporation, Hsinchu (TW)

(*) Notice: Subject to any disclaimer, the term of this patent is extended or adjusted under 35 U.S.C. 154(b) by 852 days.

(21) Appl. No.: 11/164,020

(22) Filed: Nov. 8, 2005

(65) Prior Publication Data

US 2006/0250562 A1    Nov. 9, 2006

(30) Foreign Application Priority Data

May 9, 2005 (TW) .............................. 94114860 A

(51) Int. Cl.
*G02F 1/1337* (2006.01)
*G02F 1/1333* (2006.01)

(52) U.S. Cl. ........................................ 349/129; 349/138

(58) Field of Classification Search .................. 349/143, 349/139, 129, 114, 128, 138, 141
See application file for complete search history.

(56) References Cited

U.S. PATENT DOCUMENTS

| | | | |
|---|---|---|---|
| 5,706,064 A * | 1/1998 | Fukunaga et al. ............ 349/43 |
| 6,943,861 B2 * | 9/2005 | Tomioka et al. ............. 349/141 |
| 2003/0038910 A1 * | 2/2003 | Nagano et al. ............... 349/113 |
| 2003/0133059 A1 * | 7/2003 | Wei et al. .................... 349/113 |
| 2004/0075798 A1 * | 4/2004 | Inoue et al. .................. 349/129 |
| 2004/0196427 A1 * | 10/2004 | Um et al. ..................... 349/143 |
| 2004/0227877 A1 * | 11/2004 | Jeong et al. .................. 349/114 |
| 2005/0083470 A1 * | 4/2005 | Ono et al. .................... 349/143 |
| 2005/0088598 A1 * | 4/2005 | Matsumori et al. .......... 349/139 |
| 2005/0094067 A1 * | 5/2005 | Sakamoto et al. ........... 349/114 |
| 2005/0122459 A1 * | 6/2005 | Song et al. ................... 349/139 |
| 2005/0157225 A1 * | 7/2005 | Toyooka et al. .............. 349/99 |
| 2005/0237455 A1 * | 10/2005 | Fujioka et al. ............... 349/114 |

* cited by examiner

*Primary Examiner* — Jessica M Merlin
(74) *Attorney, Agent, or Firm* — Jianq Chyun IP Office

(57) ABSTRACT

An active matrix substrate is provided. The active matrix substrate includes a substrate, a plurality of scan lines disposed on the substrate, a plurality of data lines disposed on the substrate, a plurality of pixel units disposed on the substrate and a dielectric layer disposed on the substrate. The pixel units are electrically connected with the corresponding scan lines and data lines. Each pixel unit includes an active device and a pixel electrode electrically connected with the active device, such a pixel electrode includes at least a first slit. The dielectric layer covers the first slit, and the dielectric layer includes a plurality of second slits for exposing a part of each of the pixel electrodes.

20 Claims, 23 Drawing Sheets

LIQUID CRYSTAL DISPLAY AND ACTIVE MATRIX SUBSTRATE

CROSS-REFERENCE TO RELATED APPLICATION

This application claims the priority benefit of Taiwan application serial no. 94114860, filed on May 9, 2005. All disclosure of the Taiwan application is incorporated herein by reference.

BACKGROUND OF THE INVENTION

1. Field of the Invention

The present invention relates to a liquid crystal display panel, and particularly, to a multi-domain vertical alignment liquid crystal display (MVA-LCD) panel.

2. Description of Related Art

Nowadays, the thin film transistor liquid crystal display (TFT-LCD) is highly required having the characteristics of high contrast ratio, no gray scale inversion, little color shift, high luminance, high color richness, high color saturation, rapid response and wide viewing angle. The conventional displays which can match the demand for wide viewing angle include twisted nematic (TN) LCDs with wide viewing films, in-plane switching (IPS) LCDs, fringe field switching (FFS) LCDs and multi-domain vertical alignment (MVA) TFT-LCDs. For example, an MVA-LCD panel uses alignment patterning, such as alignment protrusions or slits, to make the liquid crystal molecules of each pixel multi-directionally distributed and thus obtain a plurality of domains. The structure of an MVA-LCD panel is described below.

FIGS. 1 and 1' are respectively a cross-sectional view and a top view of a conventional MVA-LCD panel. Referring to FIG. 1, a conventional MVA-LCD panel 100 includes a TFT array substrate 110, a color filter substrate 120 and a liquid crystal layer 130. The liquid crystal layer 130 is disposed between the TFT array substrate 110 and the color filter substrate 120.

Referring to FIGS. 1 and 1', in the MVA-LCD panel 100, the TFT array substrate 110 includes a substrate 112, a plurality of scan lines 114, a plurality of data lines 116 and a plurality of pixel units 118. The scan lines 114, the data lines 116 and the pixel units 118 are all disposed on the substrate 112. The scan lines 114, the data lines 116 are respectively electrically connected with the corresponding pixel units 118. Each pixel unit 118 includes a TFT 118a and a pixel electrode 118b, wherein the pixel electrode 118b is electrically connected with the TFT 118a, the pixel unit 118b includes slits S1.

As shown in FIGS. 1 and 1', the color filter substrate 120 includes a substrate 122, a color filter film 124, a common electrode 126 and a plurality of alignment protrusions P. The color filter film 124 is disposed on the substrate 122; the common electrode 126 is disposed on the color filter film 124; and the alignment protrusions P are disposed on the common electrode 126. It should be noted that the slits S1 of the TFT array substrate 110 and the alignment protrusions P of the color filter substrate 120 are adapted to align the liquid crystal molecules to form a plurality of domains in the MVA-LCD panel 100.

FIGS. 2 and 2' are respectively a cross-sectional view and a top view of another conventional MVA-LCD panel. Except the color filter substrate 120', the MVA-LCD panel 100' illustrated in FIG. 2 is similar to the MVA-LCD panel 100 shown in FIG. 1. It can be clearly known from the FIGS. 2 and 2', the color filter substrate 120' includes a substrate 120, a color filter film 124 and a common electrode 126. The color filter film 124 is disposed on the substrate 122; the common electrode 126 is disposed on the color filter film 125; and the common electrode 126 includes a plurality of slits S2. Herein, similar to the slits S1 of the TFT array substrate 110, the slits S2 of the color filter substrate 120' are also adapted to align the liquid crystal molecules to form a plurality of domains in the MVA-LCD panel 100'.

In the MVA-LCD panels mentioned above, the TFT array substrate and the color filter substrate should be accurately aligned during assembly. Otherwise, the relative position between the alignment patterns such as slits and alignment protrusions can not be precisely controlled. A mis-alignment between the alignment patterns may affect the response time and viewing angles of the MVA-LCD panel or even cause a problem of image residue.

SUMMARY OF THE INVENTION

The present invention is directed to provide an active matrix substrate having two kinds of slits respectively for different alignment functions.

The present invention is directed to provide an LCD panel, whose display quality is not affected by the alignment precision of the substrates.

The present invention is to provide an active matrix substrate fabricating method which is compatible with the current processing methods.

The present invention provides an active matrix substrate. The active matrix substrate includes a substrate, a plurality of scan lines disposed on the substrate, a plurality of data lines disposed on the substrate, a plurality of pixel units disposed on the substrate and a dielectric layer disposed on the substrate. The pixel units are electrically connected with the corresponding scan lines and data lines. Each pixel unit includes an active device and a pixel electrode controlled by the active device and each pixel electrode includes at least a first slit. The dielectric layer disposed on the substrate covers the first slit, and the dielectric layer located in each pixel unit includes at least a second slit to expose a part of the corresponding pixel electrode.

The present invention provides an LCD panel, including a foregoing active matrix substrate, an opposite substrate and a liquid crystal layer. The opposite substrate includes a common electrode layer disposed thereon, and the liquid crystal layer is disposed between the active matrix substrate and the common electrodes of the opposite substrate.

According to an embodiment of the invention, at least one of the first slits and the second slits are jagged slits.

According to an embodiment of the invention, each of the pixel units may further include a light shielding layer disposed under the second slit(s) of the dielectric layer. The light shielding layer may be comprised of a conductor and forms a storage capacitor with the pixel electrode.

According to an embodiment of the invention, each of the pixel units may further include a storage capacitor disposed under the second slit(s) of the dielectric layer. The storage capacitor, for example, may include a lower electrode disposed on the substrate and an upper electrode disposed above the lower electrode. The upper electrode is electrically connected with the corresponding pixel electrode. Furthermore, at least one of the upper electrodes and/or the lower electrodes, for example, is comprised of a light shielding material.

According to an embodiment of the invention, the dielectric constant of the dielectric layer, for example, is less than about 3.5 and the thickness of the dielectric layer, for example, ranges from 1 µm to 2 µm. Further, the dielectric layer has a taper angle on each of both sides of the second slit.

The present invention is also directed to provide a fabricating method for fabricating an active matrix substrate. The method includes the following steps. First, a plurality of scan lines, a plurality of data lines, and a plurality of active devices are formed on a substrate such that each of the active devices is electrically connected with the corresponding scan line and data line. Then, a plurality of pixel electrodes electrically connected with the active devices are formed on the substrate and each of the pixel electrodes has at least a first slit. Thereafter, a dielectric layer for covering the first slit is formed on the substrate such that the dielectric layer located on each of the pixel electrodes has at least a second slit for exposing a part of the corresponding pixel electrode.

According to an embodiment of the invention, the scan lines, the data lines and the active devices are formed by following steps. First, a first conductive layer is formed on the substrate, the first conductive layer includes a plurality of scan lines and a plurality of gates connected with the scan lines. Then, a gate insulating layer is formed on the substrate to cover the first conductive layer. Thereafter, a plurality of channel layers disposed over the gate are formed on the gate insulating layer, wherein the channel layers are disposed over the gates. Ultimately, a second conductive layer is formed on the gate insulating layer such that the second conductive layer includes a plurality of data lines and a plurality of source/drain electrodes electrically connected with the corresponding data lines, each of the source/drain electrodes cover a part of the corresponding channel layers.

According to an embodiment of the invention, the step of forming the plurality of scan lines, the plurality of data lines, and the plurality of active devices comprises forming a plurality of storage capacitors.

According to another embodiment of the invention, the lower electrode of the storage capacitor can be formed together with the scan lines and the gate while the upper electrode is formed together with the data lines and the source/drain electrodes, wherein the upper electrode is electrically connected with the corresponding pixel electrode.

According to an embodiment of the invention, a passivation layer can be formed for covering the scan lines, the data lines and the active devices before forming the pixel electrodes.

In the MVA-LCD panel of the present invention, the liquid crystal molecules are aligned by the first slits of the pixel electrodes and the second slits of the dielectric layer for aligning. The positions of the first slits and the second slits can be accurately controlled because the first slits and the second slits are formed on the same substrate. Therefore, the display quality of the MVA-LCD panel will not be affected by the alignment precision of the substrates.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 4A' to 4F' are respectively top views of FIGS. 4A to 4F.

FIGS. 6A' to 6F' are respectively top views of FIGS. 6A to 6F.

FIGS. 8A' to 8F' are respectively top views of FIGS. 8A to 8F.

DESCRIPTION OF THE EMBODIMENTS

The First Embodiment

Figure 1:
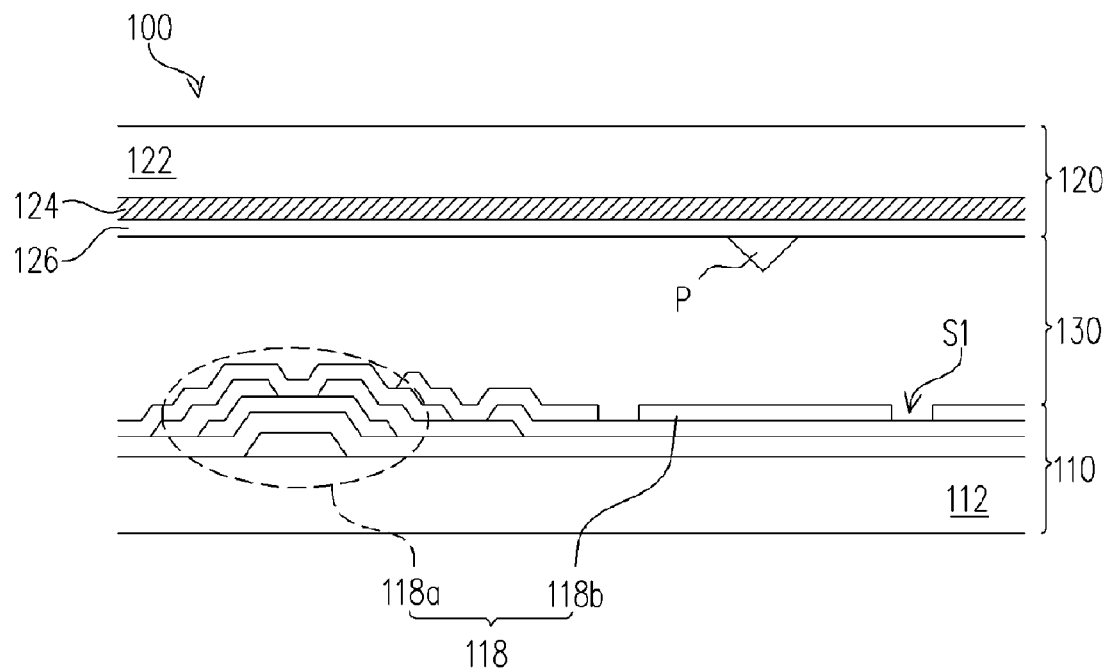
FIGS. 1 and 1' are respectively a cross-sectional view and a top view of a conventional MVA-LCD panel.
Figure 1:
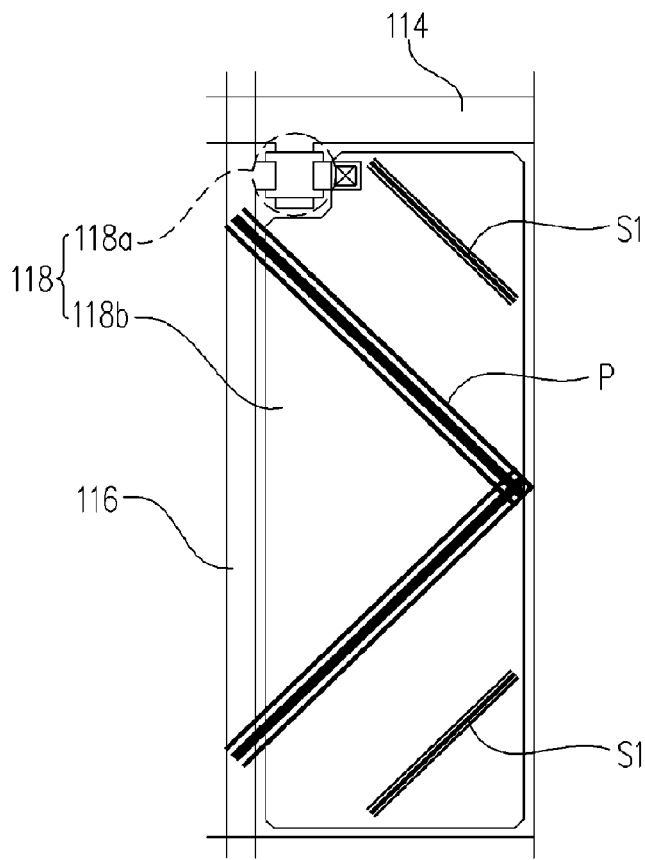
Figure 2:
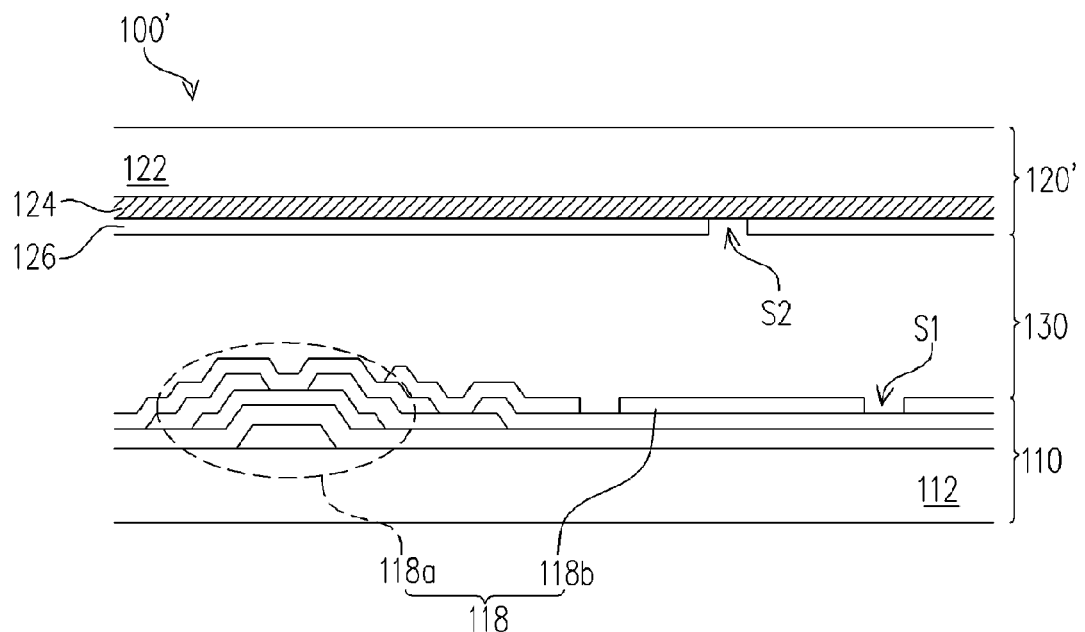
FIGS. 2 and 2' are respectively a cross-sectional view and a top view of another conventional MVA-LCD panel.
Figure 2:
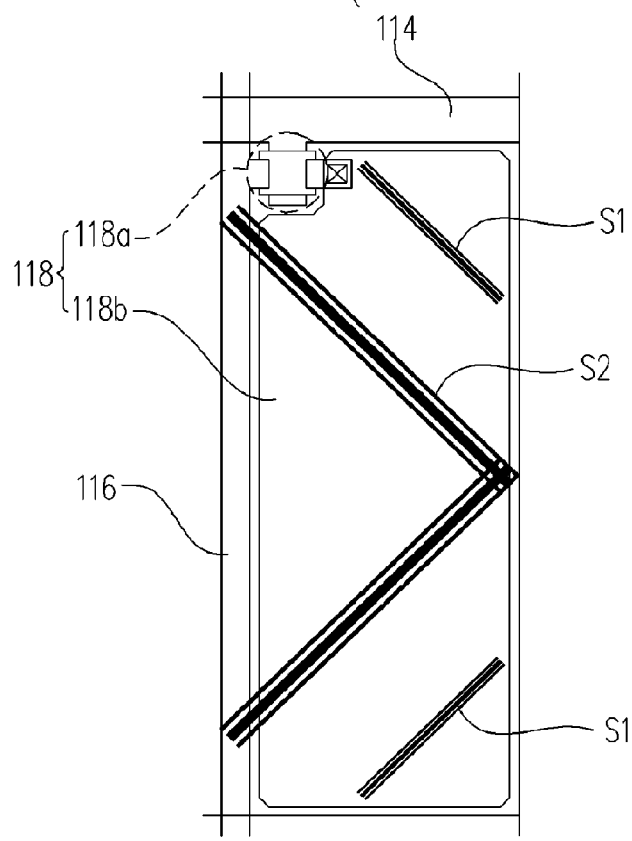
Figure 3:
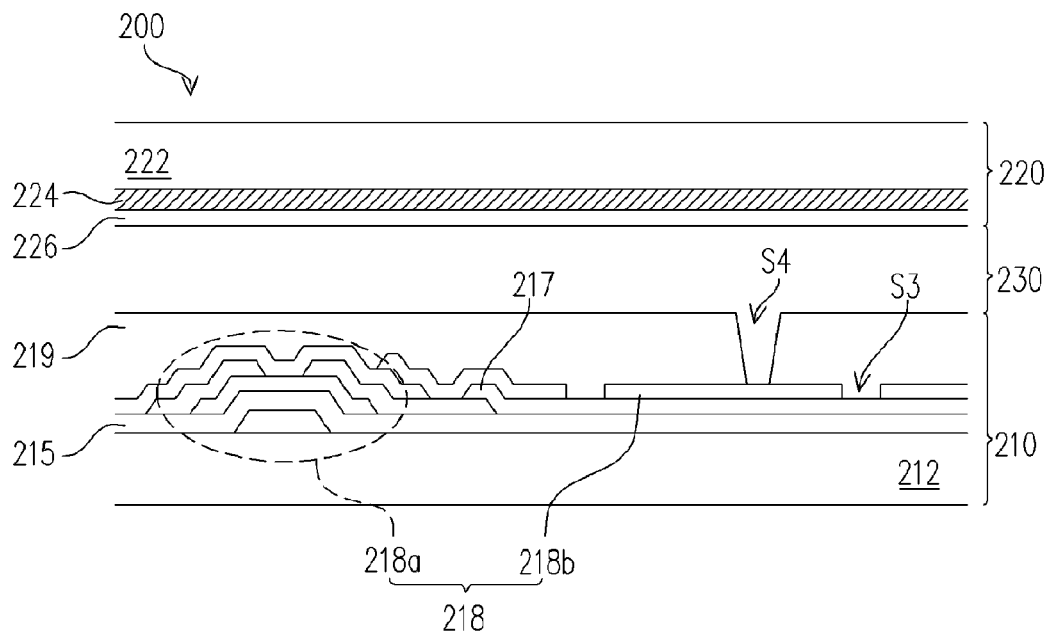
FIGS. 3 and 3' are respectively a cross-sectional view and a top view of an MVA-LCD panel according to the first embodiment of the invention.
Figure 3:
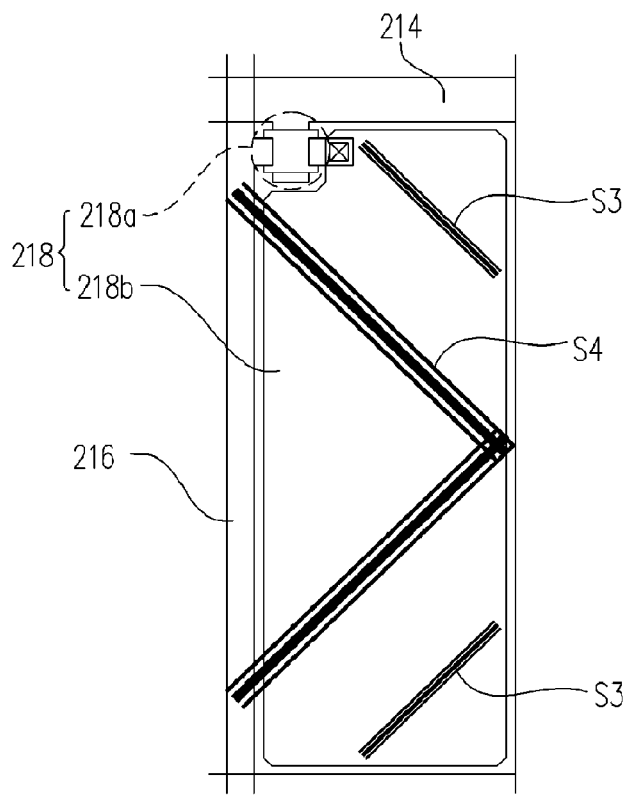

FIGS. 3 and 3' are respectively a cross-sectional view and a top view of an MVA-LCD panel according to the first embodiment of the invention. Referring to FIGS. 3 and 3', an MVA-LCD panel 200 according to the embodiment includes an active matrix substrate 210, an opposite substrate 220 and a liquid crystal layer 230. The liquid crystal layer 230 is disposed between the active matrix substrate 210 and the opposite substrate 220.

Referring to FIGS. 3 and 3', the active matrix substrate 210 of the MVA-LCD panel 200 includes a substrate 212, a plurality of scan lines 214, a plurality of data lines 216, a plurality of pixel units 218 and a dielectric layer 219. The scan lines 214, the data lines 216, the pixel units 218 and the dielectric layer 219 are all disposed on the substrate 212. The scan lines 214, the data lines 216 are electrically connected with the corresponding pixel units 218. More specifically, the scan lines 214 for example extend along with the horizontal direction being parallel with each other and the data lines 216 for example extend along with the vertical direction being parallel with each other. Therefore, a plurality of pixel regions are accordingly defined on the substrate 212, in which the pixel units 218 are respectively disposed.

According to the embodiment, each pixel unit 218 includes an active device 218a and a pixel electrode 218b, wherein the pixel electrode 218b is electrically connected with the active device 218a, and the pixel electrode 218b has at least a first slit S3. The active devices 218a of the present invention can be any type of TFTs, such as a-Si TFT or LTPS-TFT (low temperature polysilicon TFT). In addition, the configuration of the TFT can be a top gate TFT or a bottom gate TFT. However, the active devices according to the present invention can be other tri-polar switching devices.

As shown in FIG. 3, the dielectric layer 219 covers the first slits S3 of the pixel electrodes 218b, while the dielectric layer 219 located in each of the pixel units 218 has at least a second slit S4 for exposing a part of the corresponding pixel electrodes 218b. Since the first slits S3 of the pixel electrodes 218b are covered by the dielectric layer 219 and a part of the pixel electrodes 218b is exposed by the second slits S4, the liquid crystal layer 230 over the first slits S3 and the second slits S4 are affected to different degree. Also, the foregoing first slits S3 and second slits S4 can be jagged slits or stripe (non-jagged) slits, or slits of any other types being able to align the liquid crystal layer 230. Furthermore, the types of the first slits S3 and the second slits S4 can be the same or different. The slits S3, S4 shown in FIG. 3' are stripe slits, while jagged slits are not shown in the FIGS.

Again referring to FIGS. 3 and 3', the opposite substrate 220 according to the embodiment is a color filter substrate including a substrate 222, a color filter thin film 224 and a common electrode 226. The color filter thin film 224 is disposed on the substrate 222. The common electrode 226 is disposed on the color filter thin film 224. According to the embodiment, since all alignment patterns (the first slits S3 and the second slits S4) are formed on the active matrix substrate 210 instead of being formed on both the active matrix substrate 210 and the opposite substrate 220, the relative position between a first slit S3 and a second slit S4 can be accurately controlled without being affected by the alignment precision of the substrates. In other words, the embodiment can align the liquid crystal layer 230 by the first slits S3 and the second slits S4 of the active matrix substrate 210 for generating a plurality of domains in the MVA-LCD panel.

Figure 4A:
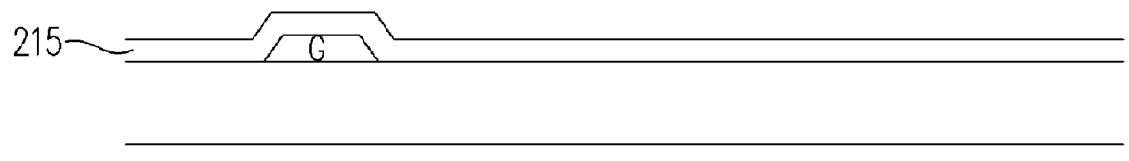
FIGS. 4A to 4F are drawings illustrating the fabricating process of a TFT array substrate according to the first embodiment of the invention.
Figure 4A:
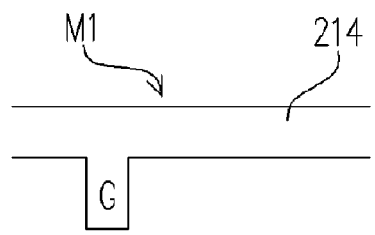

FIGS. 4A to 4F are drawings illustrating the fabricating process of a TFT array substrate according to the first embodiment of the invention. FIGS. 4A' to 4F' are respectively top views of FIGS. 4A to 4F. Referring to FIGS. 4A and 4A', a first conductive layer M1 is formed on the substrate 212, and the conductive layer M1 includes a plurality of scan lines 214 and a plurality of gates G connected with the scan lines 214. Then, a gate insulating layer 215 is formed on the substrate 212 for covering the first conductive layer M1.

Figure 4B:
Figure 4B:
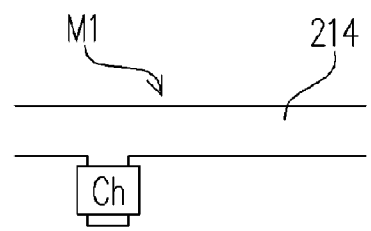

Referring to FIGS. 4B and 4B', after the gate insulating layer 215 has been formed, a plurality of channel layers Ch are formed on the gate insulating layer 215. Each of the channel layers is disposed over the corresponding gate G. According to the present embodiment, the channel layers Ch are made of amorphous silicon or other semiconductor materials. Further, an ohmic contact layer can be formed over the channel layers Ch if required.

Figure 4C:
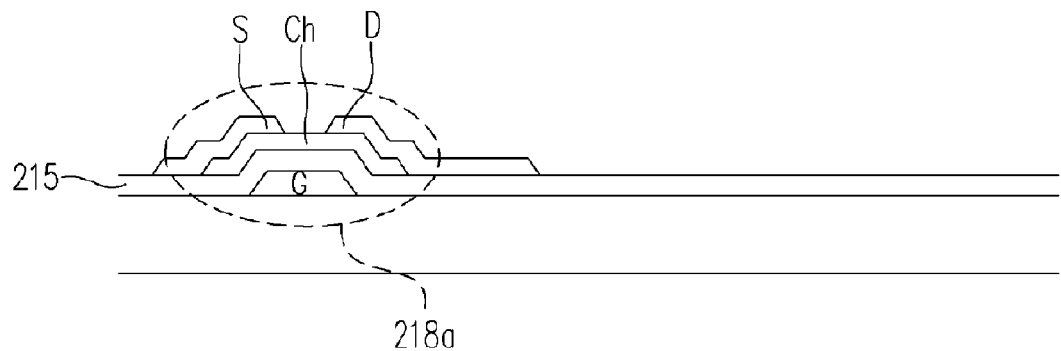
Figure 4C:
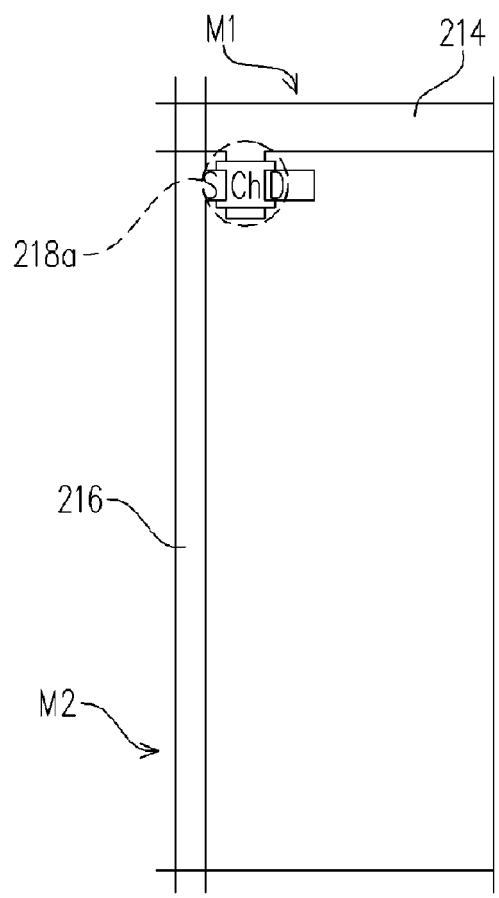

Then referring to FIGS. 4C and 4C', after the channel layers Ch has been formed, a second conductive layer M2 is formed on the gate insulating layer 215. The second conductive layer M2 includes a plurality of source electrode S and a plurality of drain electrodes D; the source electrodes S and the drain electrodes D cover a part of the corresponding channel layer Ch. After forming the source electrodes S and the drain electrodes D, the fabrication of the active device 218a (TFT) is finished. The second conductive layer M2 can be a Mo/Al/Mo composite conductive layer or other conductive materials.

Figure 4D:
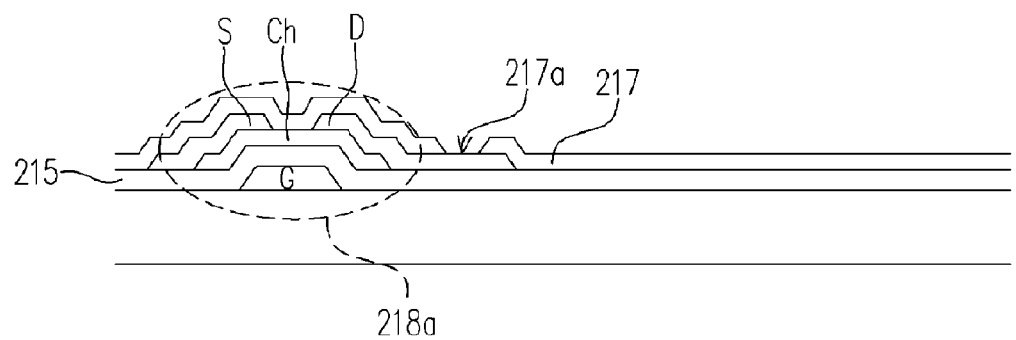
Figure 4D:
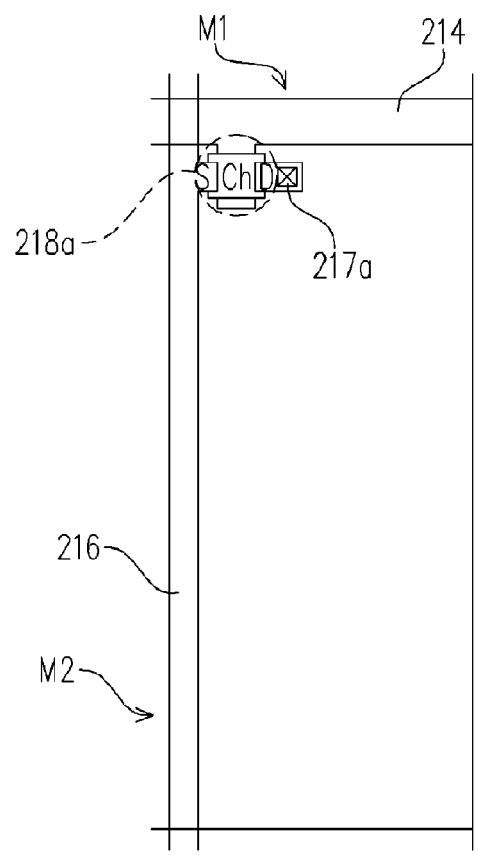

Then referring to FIGS. 4D and 4D', a passivation layer 217 is formed for covering the scan lines 214, the data lines 216 and the active devices 218 after the second conductive layer M2 has been formed. In the present embodiment, the material of the passivation layer 217 can be $SiO_2$, $Si_xN_y$, or other dielectric materials.

Figure 4E:
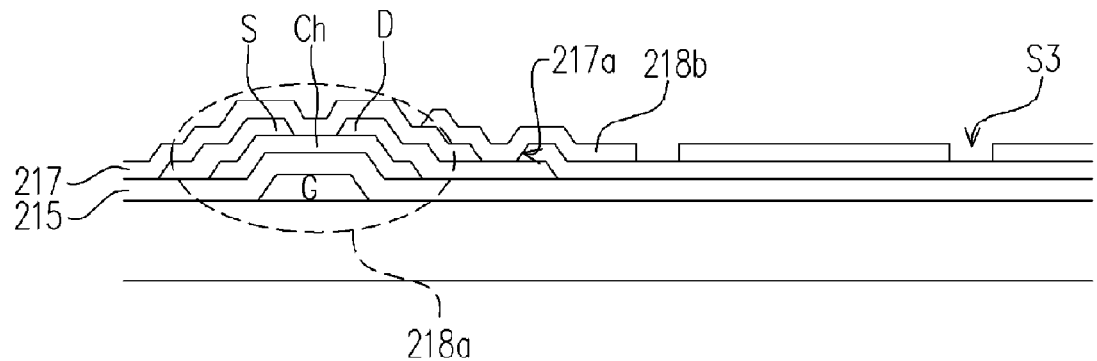
Figure 4E:
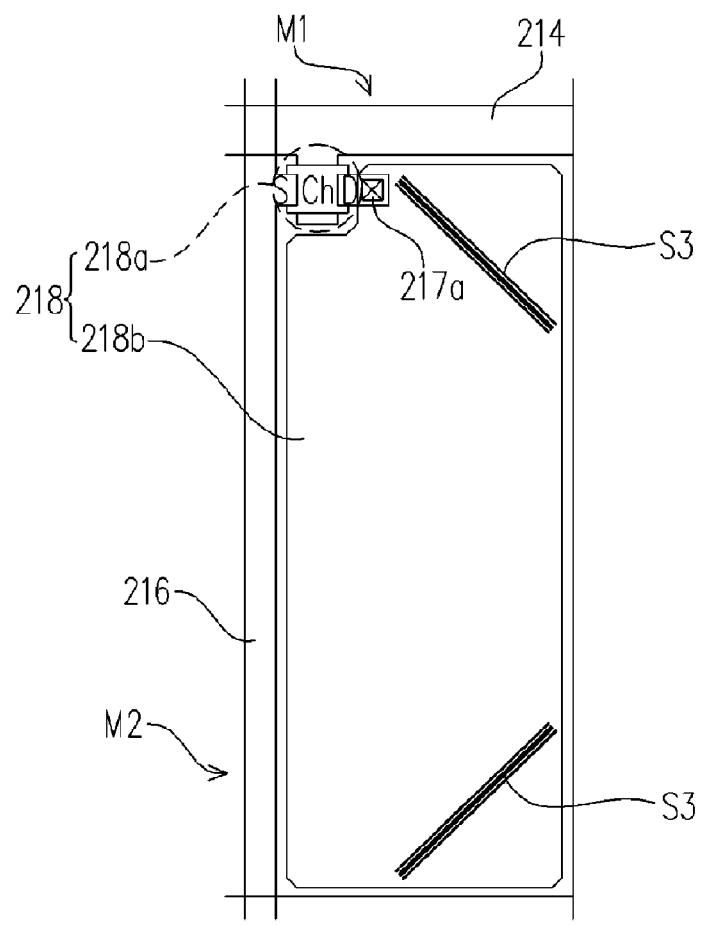

Then referring to FIGS. 4E and 4E', after the passivation layer 217 has been formed, pixel electrodes 218b are then formed, wherein each pixel electrode 218b has a first slit S3. In the embodiment, the material of the pixel electrodes includes indium tin oxide (ITO), indium-doped zinc oxide (IZO) or other conductive materials.

Figure 4F:
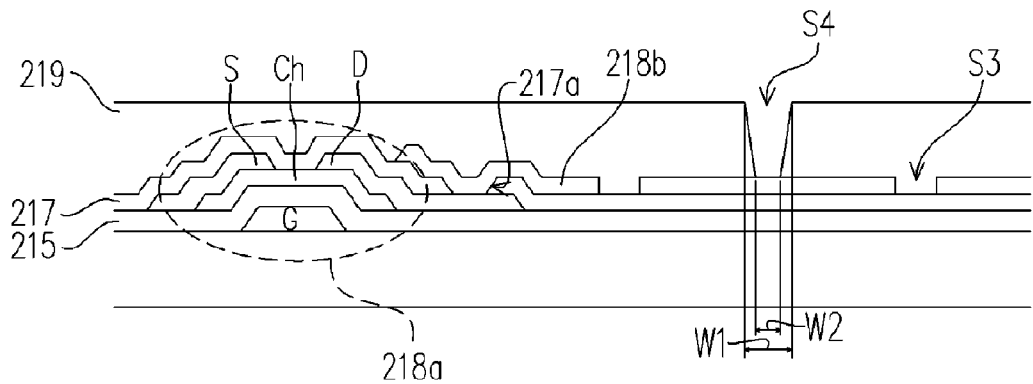
Figure 4F:
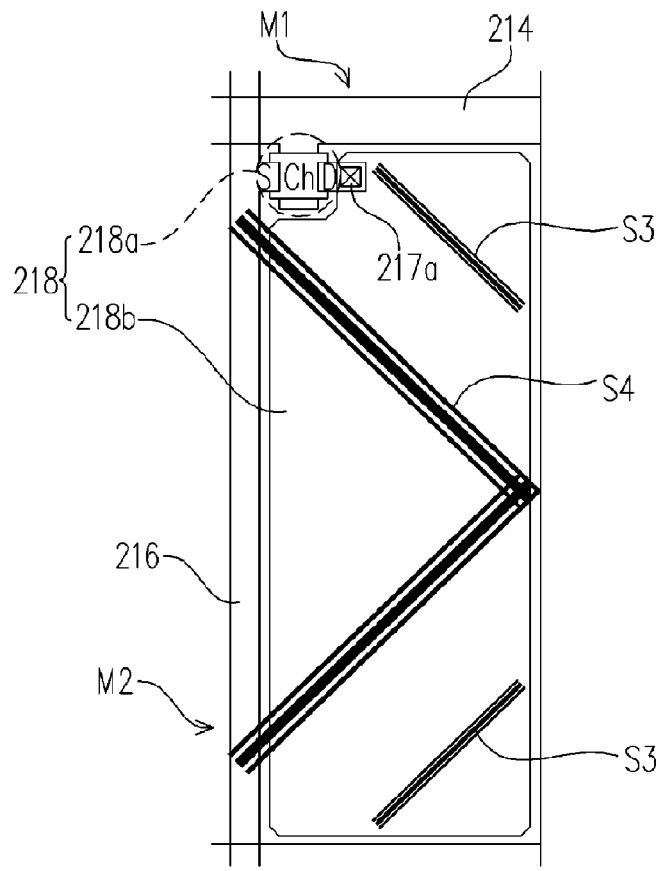

Ultimately, referring to FIG. 4F and 4F', a dielectric layer 219 is then formed over the substrate 212 for covering the first slits S3 of the pixel electrodes 218b after forming the pixel electrodes 218b. The dielectric layer 219 has a plurality of second slits S4 for exposing a part of the corresponding pixel electrodes 218b. In the present embodiment, the dielectric layer 219 is made of a dielectric material having a low dielectric constant. The dielectric constant of the dielectric material for example is less than 3.5, and the thickness of the dielectric material is from 1 μm to 2 μm, for example. It can be clearly known from FIG. 4F, the dielectric layer 219 has a taper angle on each of both sides of the second slits S4. In other words, the width W1 of the top of the second slit S4 is larger than the width W2 of the bottom of the second slits S4.

The Second Embodiment

Figure 5:
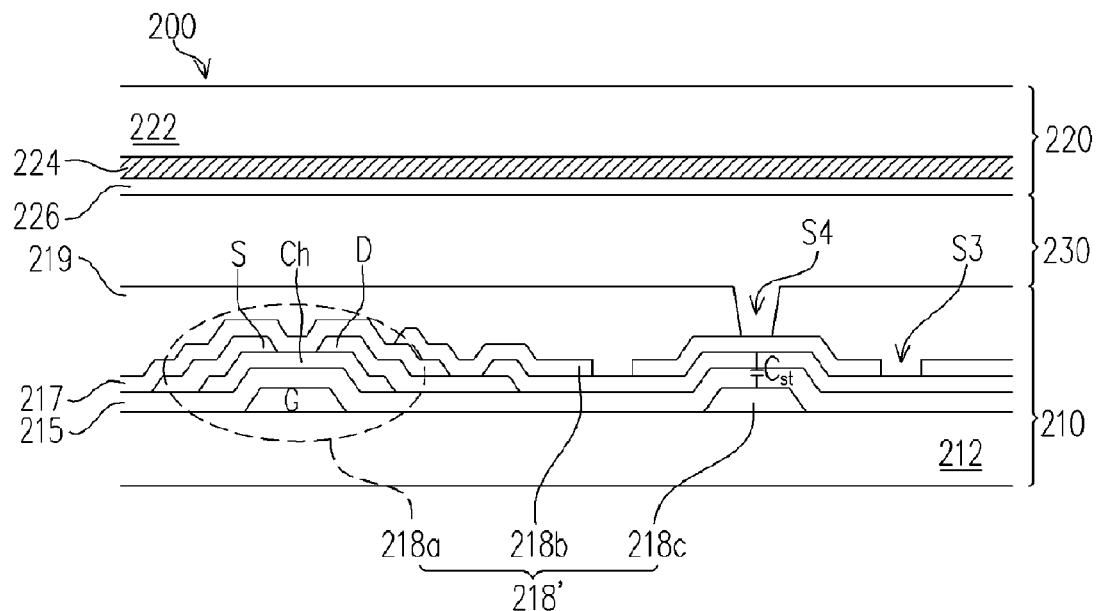
FIGS. 5 and 5' are respectively a cross-sectional view and a top view of an MVA-LCD panel according to the second embodiment of the invention.
Figure 5:
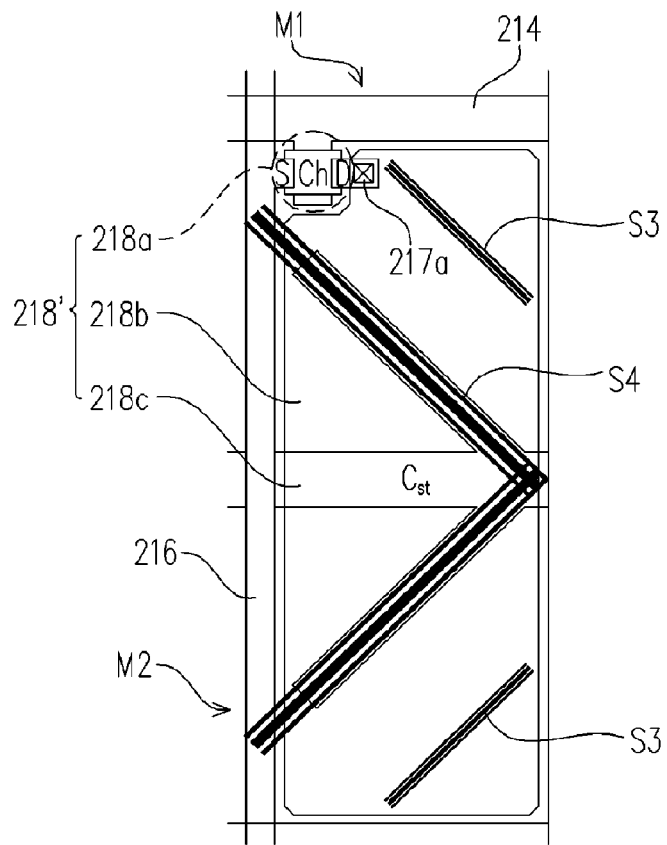

FIGS. 5 and 5' are respectively a cross-sectional view and a top view of an MVA-LCD panel according to the second embodiment of the invention. Referring to FIGS. 5 and 5', the MVA-LCD panel 200' of the embodiment is similar to the MVA-LCD panel 200 of the first embodiment except the structure of the pixel unit 218'. Specifically, the pixel unit 218' illustrated in the second embodiment includes a active device 218a, a pixel electrode 218b and a light shielding layer 218c. As shown in FIGS. 5 and 5', the light shielding layer 218c is disposed under the second slit S4 of the dielectric layer 219. In an alternative embodiment, the light shielding layer 218c is preferred but not limited to have a width larger than the width of the second slit S4. It should be noted that the employment of the light shielding layer 218c can effectively avoid the light leakage caused by the second slits S4 and further enhance the contrast ratio of the MVA-LCD panel 200'.

Furthermore, the material of the light shielding layer 218c according to the embodiment can be conductive materials, insulating materials or any other materials that can shield the light emitted from the backlight. When the light shielding layer 218c is a conductor, a storage capacitor Cst is formed by the light shielding layer 218c and the pixel electrode 218b. In other words, the light shielding layer 218c disposed under the second slit S4 can not only shield light, but also serve as a lower electrode of a storage capacitor Cst. Such a design can help save space occupied by the storage capacitors in the MVA-LCD panel 200'. Consequently, the aperture ratio of the MVA-LCD panel 200' can be further upgraded.

Figure 6A:
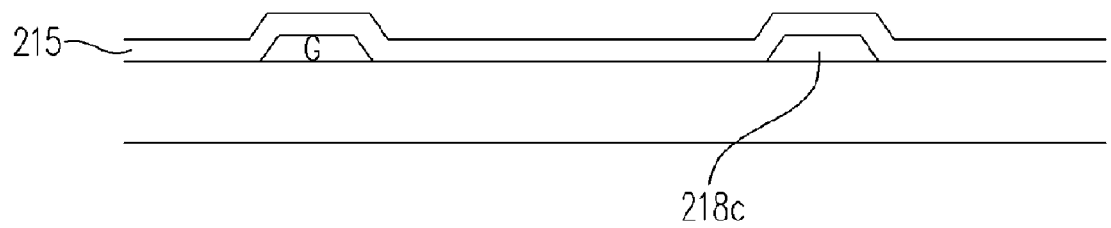
FIGS. 6A to 6F are drawings illustrating the fabricating process of a TFT array substrate according to the second embodiment of the invention.
Figure 6A:
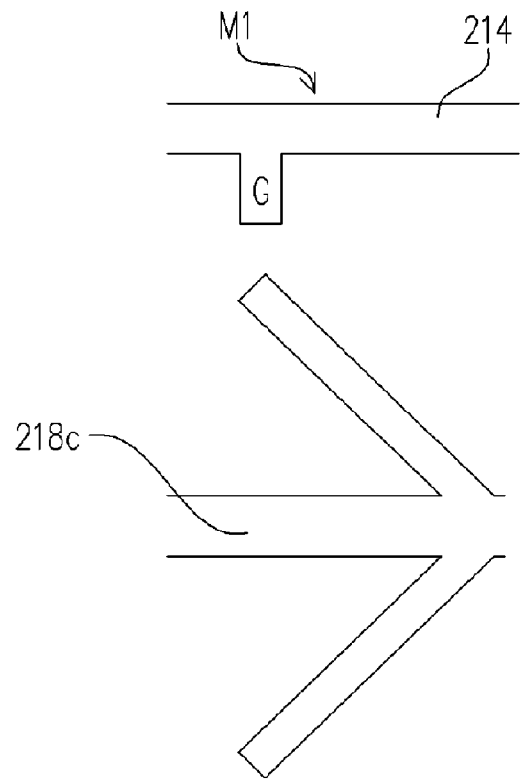
Figure 6B:
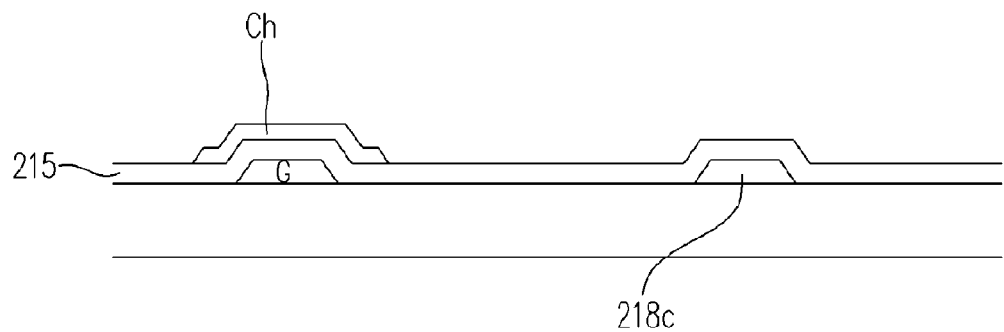
Figure 6B:
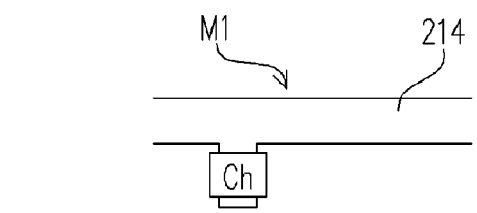
Figure 6B:
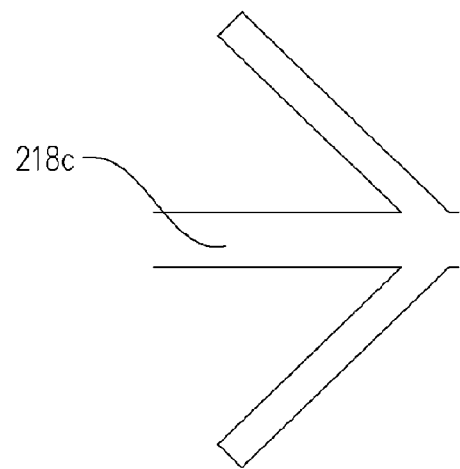
Figure 6C:
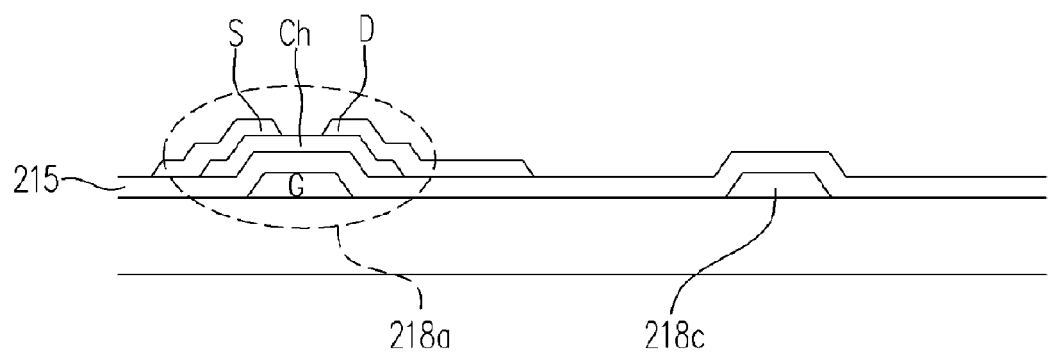
Figure 6C:
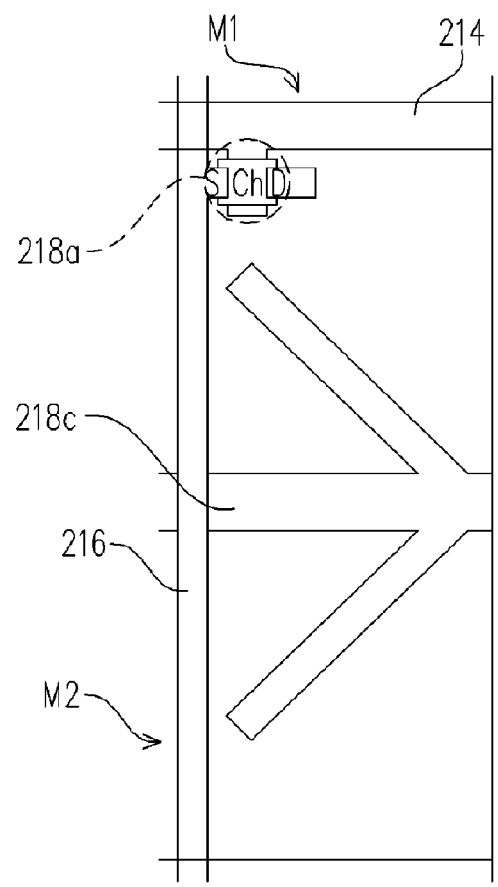
Figure 6D:
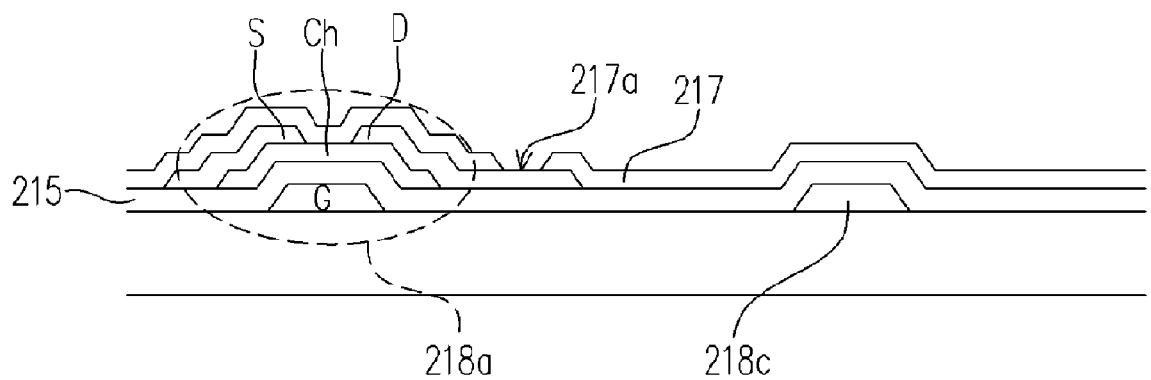
Figure 6D:
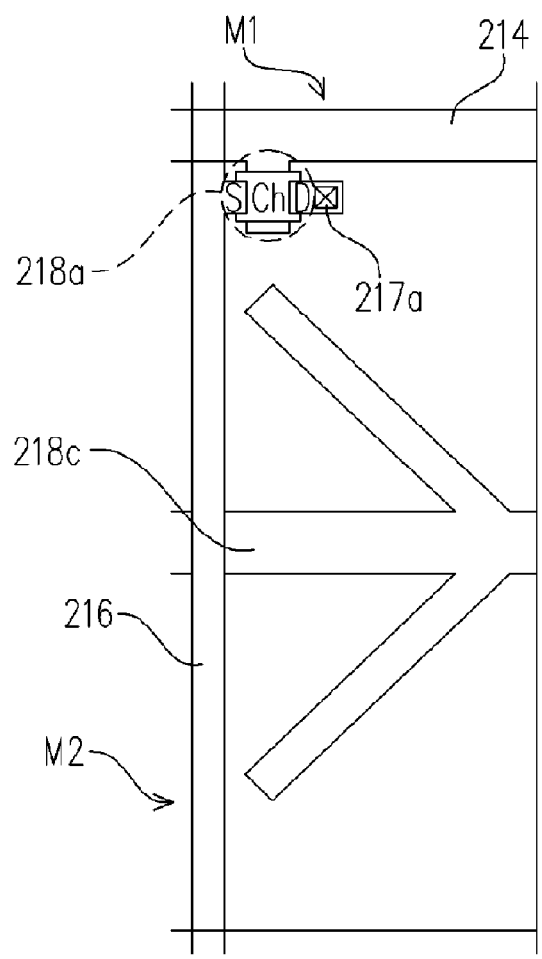
Figure 6E:
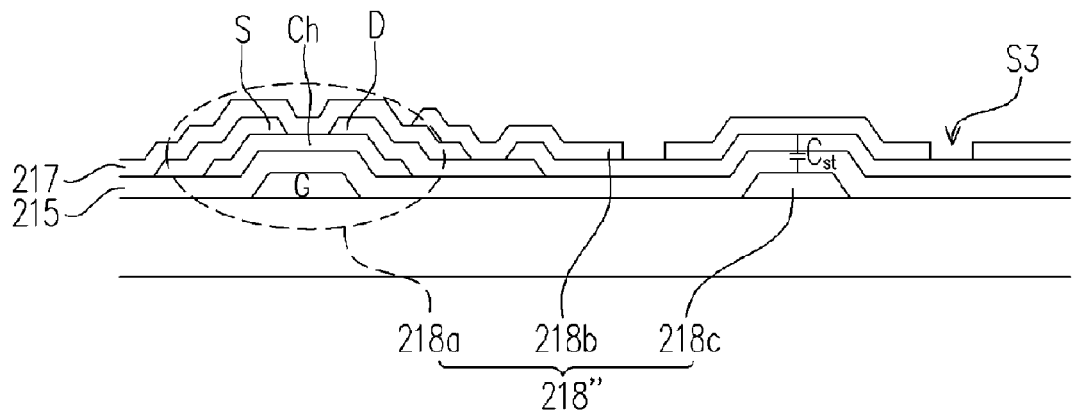
Figure 6E:
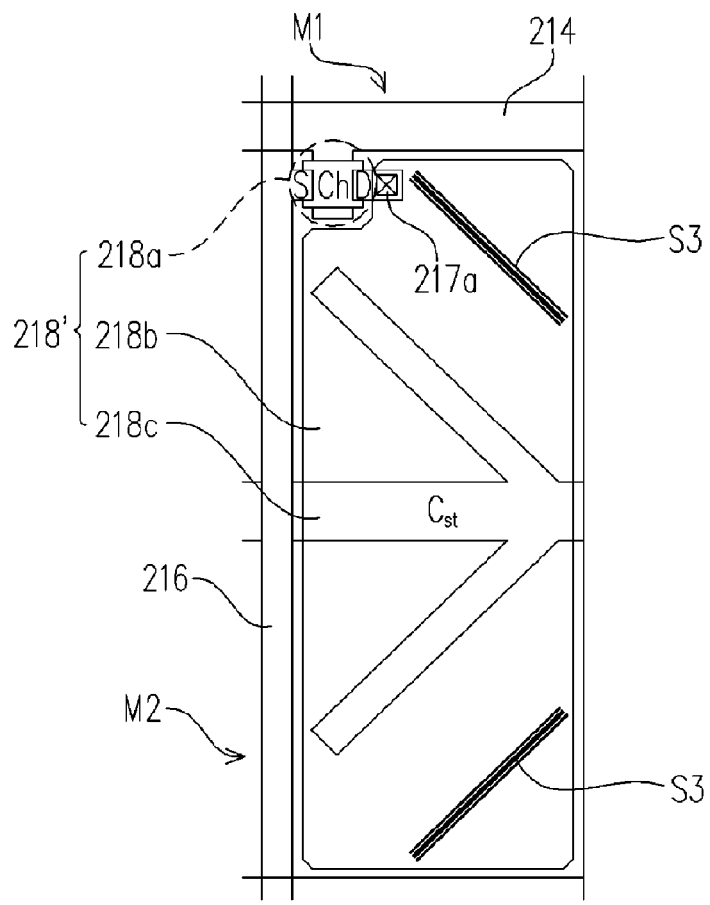
Figure 6F:
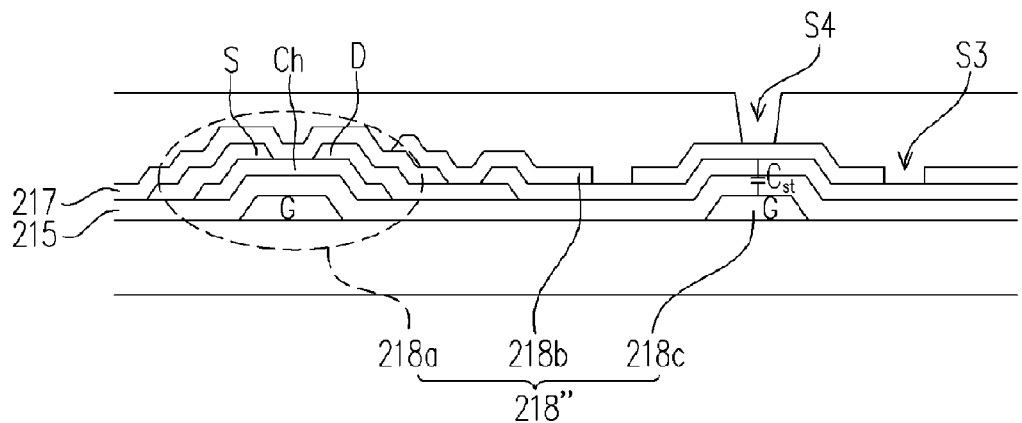
Figure 6F:
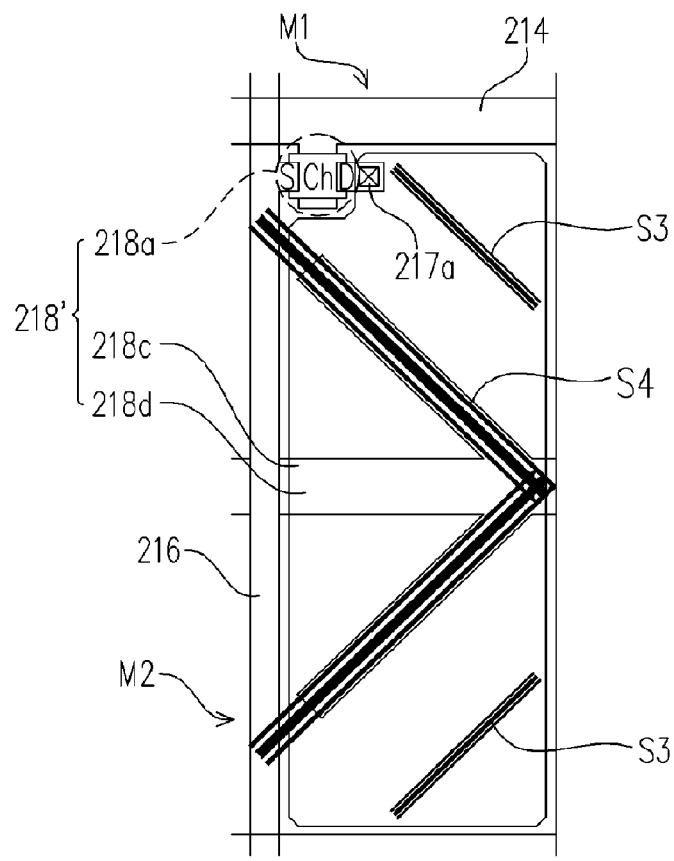

FIGS. 6A to 6F are drawings illustrating the fabricating process of a TFT array substrate according to the second embodiment of the invention. FIGS. 6A' to 6F' are respectively top views of FIGS. 6A to 6F. The fabricating process of the TFT array substrate of the embodiment is similar to that of the first embodiment except that the light shielding layer (lower electrode) 218c of the embodiment is fabricated together with the scan lines 214 and the gates G. Only the differences are illustrated below in this embodiment. The description of FIGS. 6B to 6F and FIGS. 6B' to 6F' is not repeated herein.

Referring to FIGS. 6A and 6A', a first conductive layer M1 is formed on the substrate 212. The first conductive layer M1 includes a plurality of scan lines 214, a plurality of gates G connected with the scan lines 214 and the lower electrode 218c. Then, a gate insulating layer 215 is formed on the substrate 212 for covering the first conductive layer M1. It should be noted that the lower electrode 218c can, for example, have a plurality of branches, which helps increase the storage capacitance.

The Third Embodiment

Figure 7:
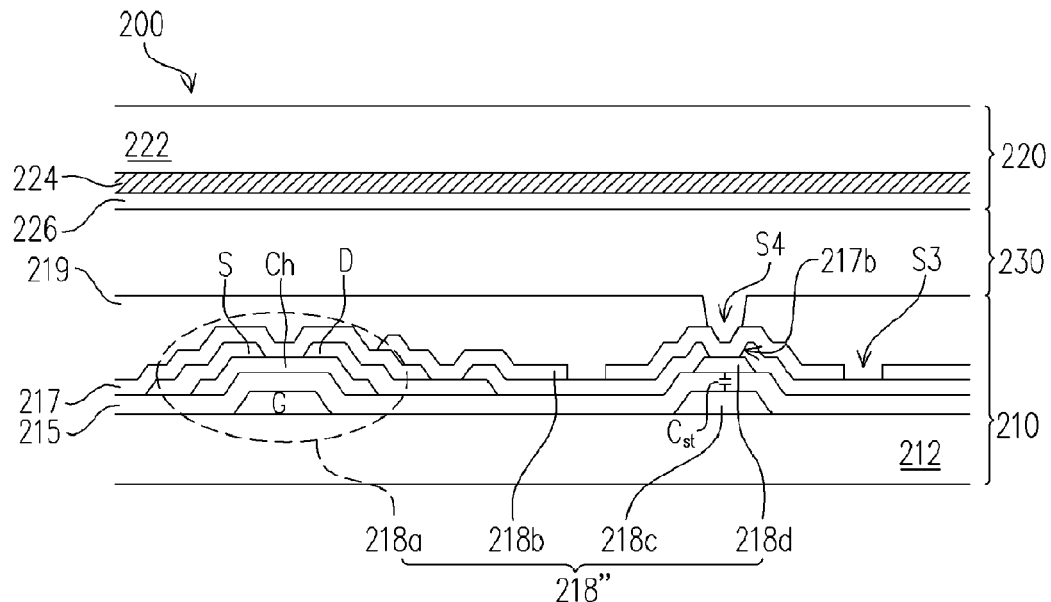
FIGS. 7 and 7' are respectively a cross-sectional view and a top view of an MVA-LCD panel according to the third embodiment of the invention.
Figure 7:
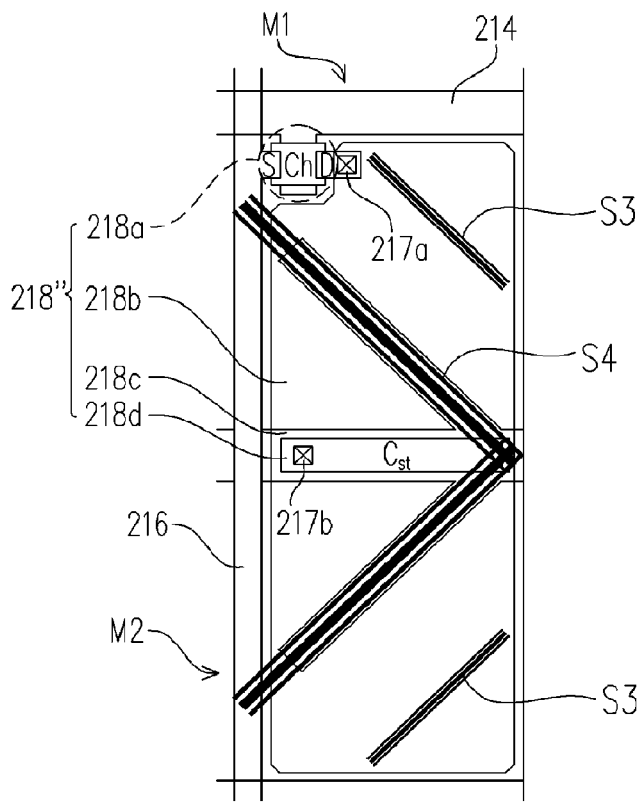

FIGS. 7 and 7' are respectively a cross-sectional view and a top view of an MVA-LCD panel according to the third embodiment of the invention. Referring to FIGS. 7 and 7', the MVA-LCD panel 200" of the embodiment is similar to the MVA-LCD panel 200' of the second embodiment except the structure of the pixel unit 218". The pixel unit 218" illustrated in the third embodiment includes an active device 218a, a pixel electrode 218b, a the light shielding layer (lower electrode) 218c and an upper electrode 218d. The upper electrode 218d is disposed between the light shielding layer 218c and the second slit S4 of the dielectric layer 219. The upper electrode 218d is electrically connected with the pixel electrode 218b via a contacting window 217b of a passivation layer 217. In an alternative embodiment, the upper electrode 218d is preferred but not limited to have a width larger than the width of the second slit S4. It should be noted that the light shielding layer (lower electrode) 218c can not only form a storage capacitor Cst with the upper electrode 218d, but also effectively avoid the light leakage caused by the second slits S4, and thus further enhance the contrast ratio of the MVA-LCD panel 200".

Figure 8A:
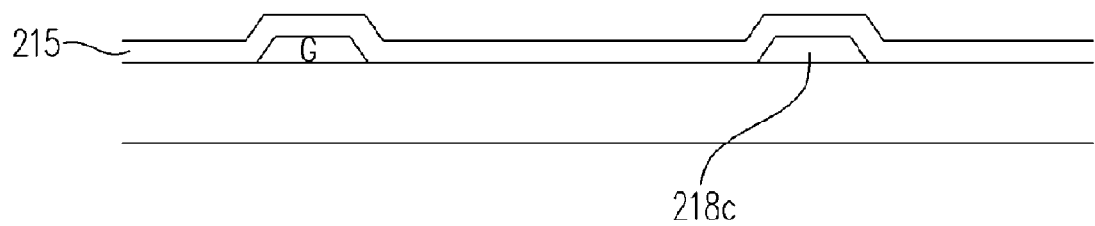
FIGS. 8A to 8F are drawings illustrating the fabricating process of a TFT array substrate according to the third embodiment of the invention.
Figure 8A:
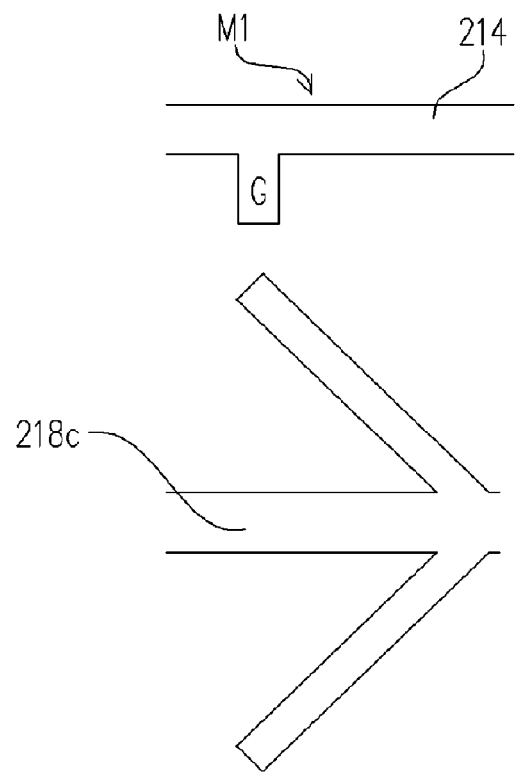
Figure 8B:
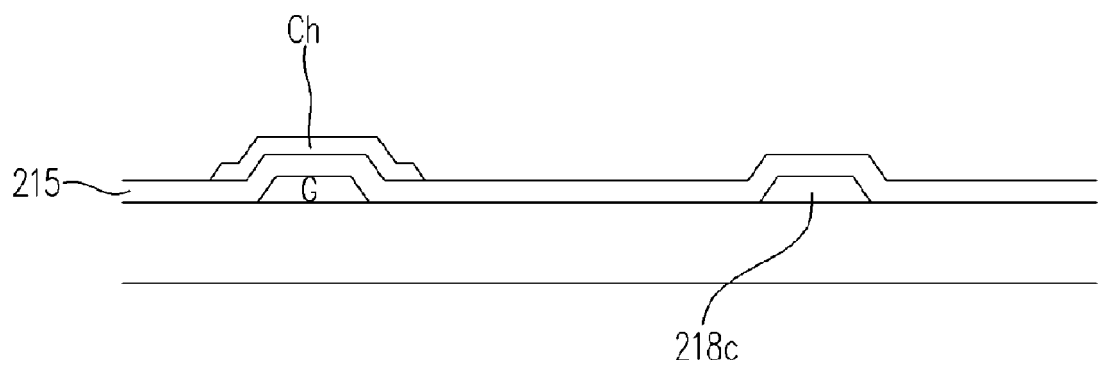
Figure 8B:
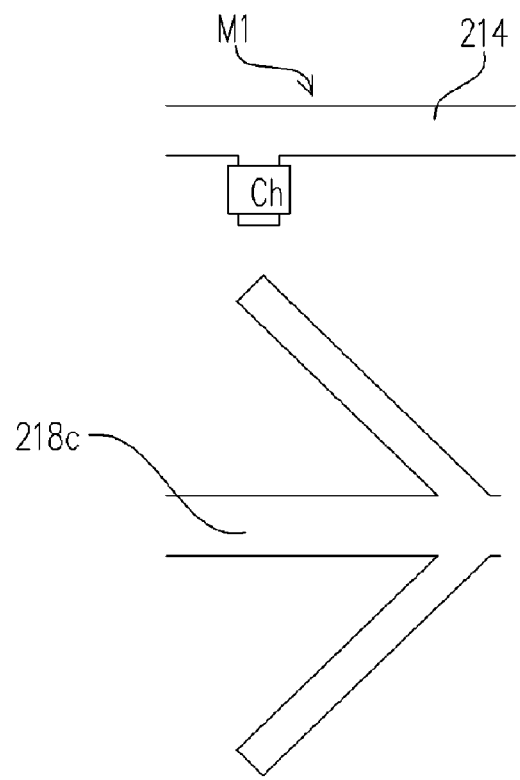
Figure 8C:
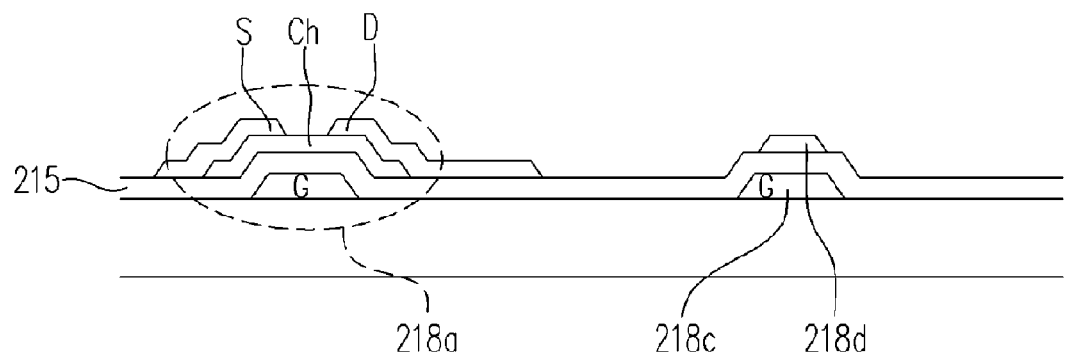
Figure 8C:
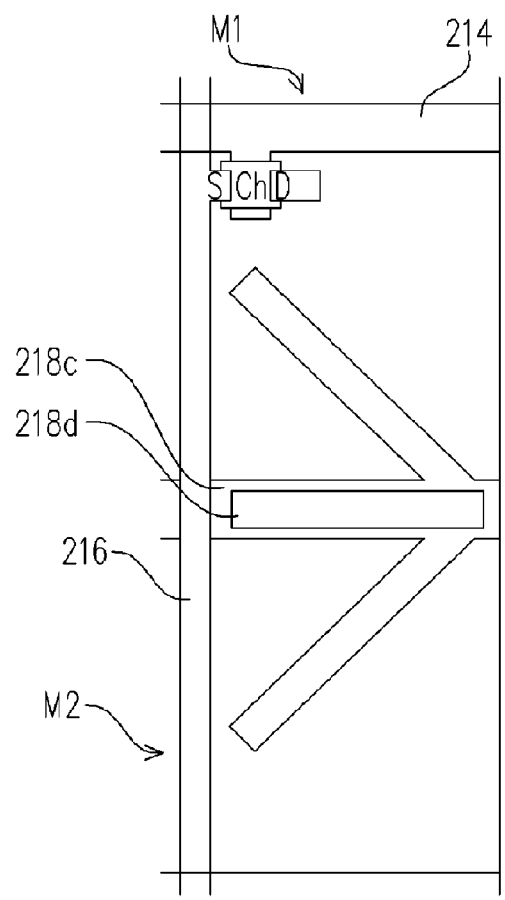
Figure 8D:
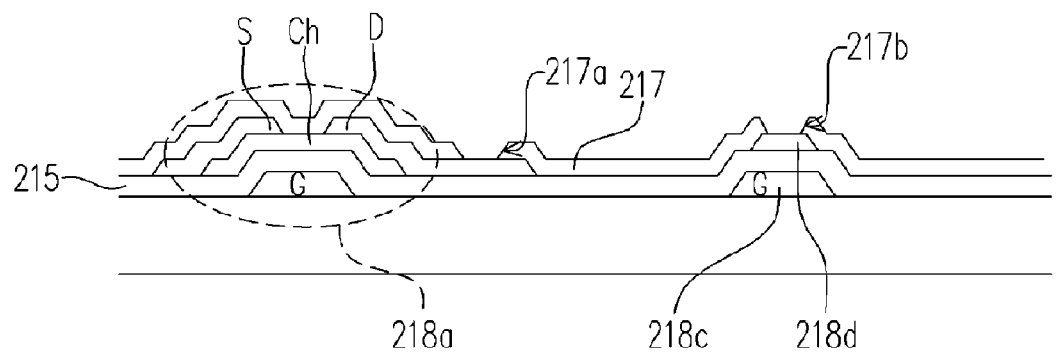
Figure 8D:
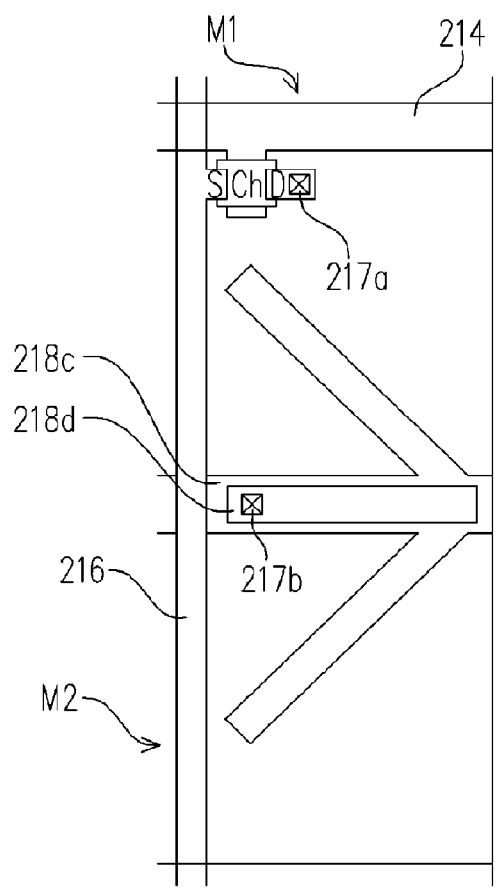
Figure 8E:
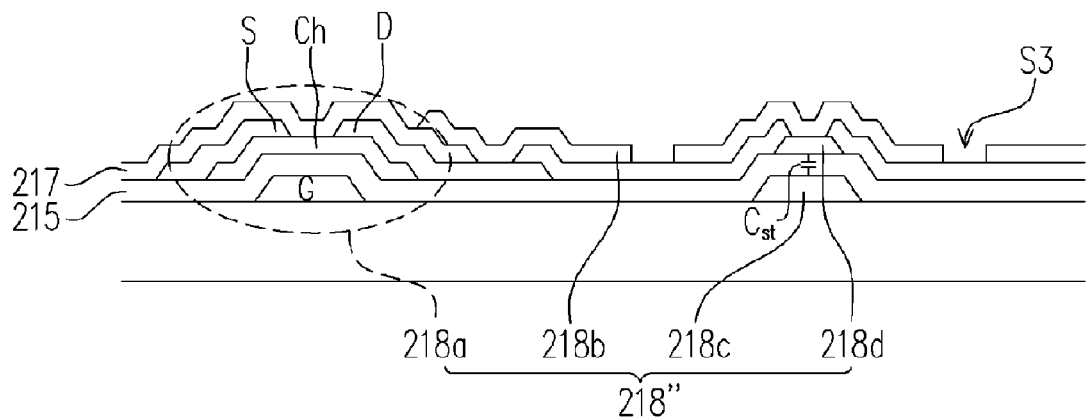
Figure 8E:
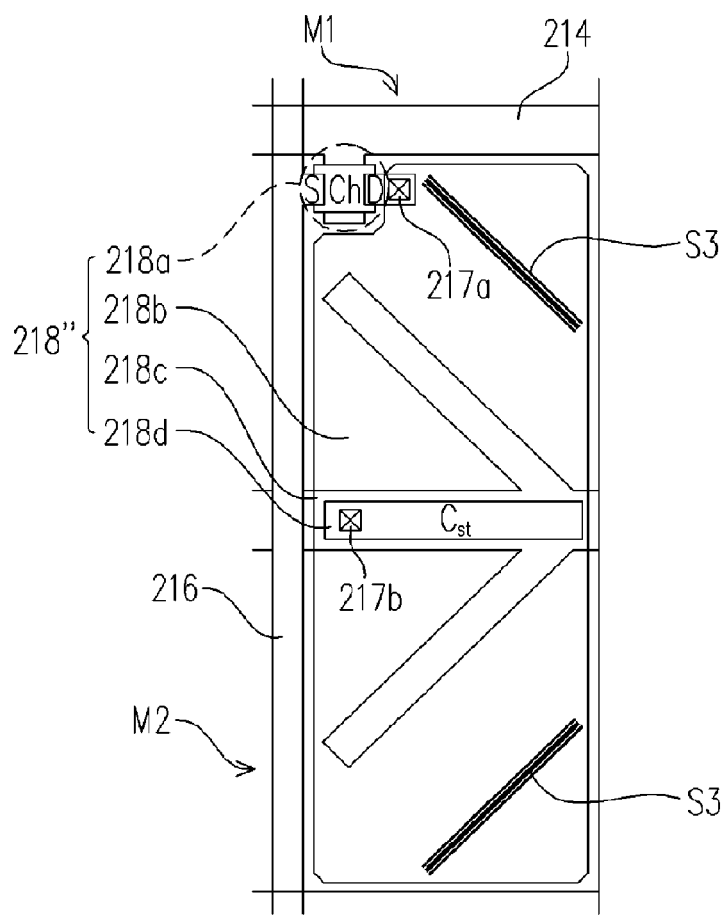
Figure 8F:
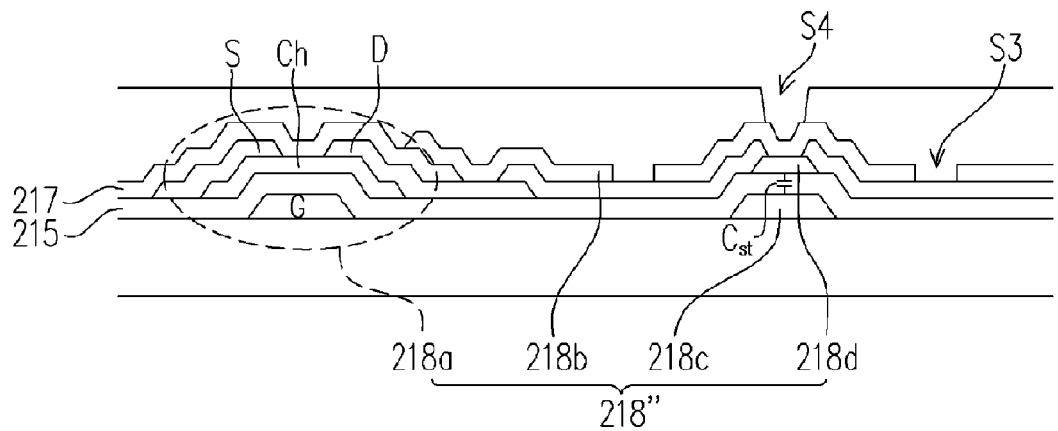
Figure 8F:
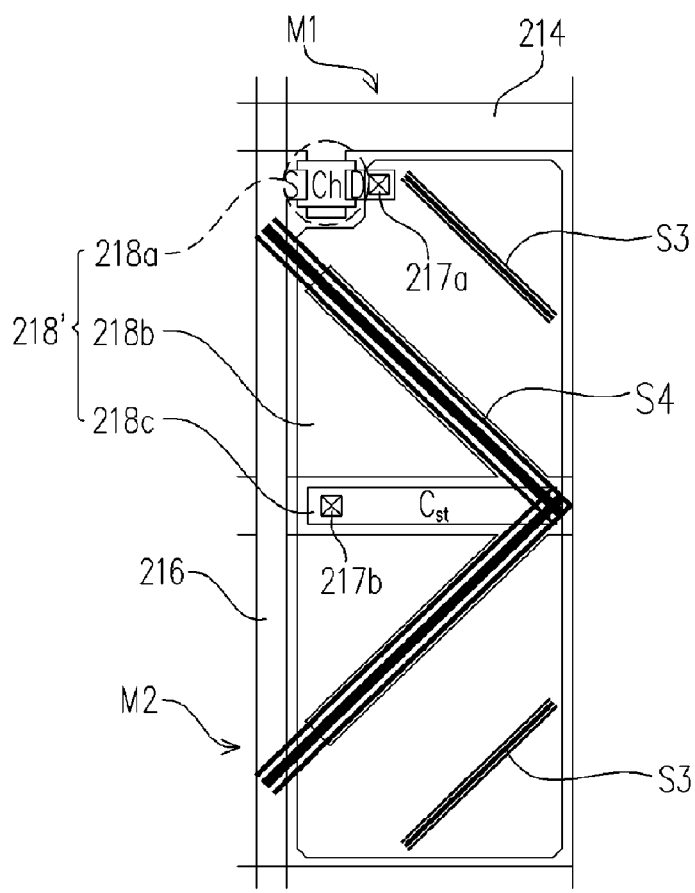

FIGS. 8A to 8F are drawings illustrating the fabricating process of a TFT array substrate according to the third embodiment of the invention. FIGS. 8A' to 8F' are respectively top views of FIGS. 8A to 8F. The fabricating process of the TFT array substrate of the embodiment is similar to that of the second embodiment except that the upper electrode 218d of the embodiment is fabricated together with the scan lines 214, the source electrode S and the drain electrode D (shown in FIGS. 8C and 8C'). Also, in order to electrically connect the upper electrode 218d and the pixel electrode 218b, a contact window 217a and a contact window 217b (as shown in FIGS. 8D and 8D') are formed in the passivation layer 217 simultaneously. Only the differences are illustrated above. The processes illustrated by FIGS. 6A to 6B, FIGS. 6A' to 6B', FIGS. 6E to 6F and FIGS. 6E' to 6F' are omitted herein.

In summary, the present invention has at least the advantages as follows:

1. The displaying quality of the MVA-LCD panel according to the present invention is not affected by the alignment precision of the substrate.
2. The MVA-LCD panel according to the invention has better contrast ratio and higher aperture ratio.
3. The active matrix substrate fabricating method according to the invention is compatible with the current processing method and will not increase additional manufacturing cost.

Other modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. An active matrix substrate, comprising:
    a substrate;
    a plurality of scan lines and a plurality of data lines disposed on the substrate, the data lines crossing the scan lines;
    an active device electrically connected with one of the scan lines and one of the data lines, wherein the active device has a drain electrode;
    a passivation layer covering the scan lines, the data lines, and the active device;
    a pixel electrode electrically connected with the active device through the drain electrode and having a first slit, wherein the first slit is enclosed by the pixel electrode, and the material of the pixel electrode includes indium tin oxide or indium-doped zinc oxide; and
    a dielectric layer covering the passivation layer and the pixel electrode, wherein the dielectric layer has a second slit unshielding a part of the pixel electrode and contacts the passivation layer through the first slit, and the first slit and the second slit are separated by a distance and without being overlapped to each other.

2. The active matrix substrate according to claim 1, wherein the first slit and the second slit are inclined with respect to the scan lines and the data lines.

3. The active matrix substrate according to claim 1, wherein a portion of the pixel electrode is disposed exactly above the drain electrode of the active device.

4. The active matrix substrate according to claim 3, wherein the second slit crosses the pixel electrode and one of the data lines.

5. The active matrix substrate according to claim 1, wherein the second slit is longer than the first slit in a slit length extending direction.

6. The active matrix substrate according to claim 1, wherein the pixel electrode is disposed within a region surrounded by the scan line and the data line electrically connected with the active device without being overlapped to the scan lines and the data lines.

7. The active matrix substrate according to claim 1, wherein the pixel electrode is delineated into a plurality of regions by the second slit, the first slit is disposed in the outmost region of the pixel electrode, and the outmost region is adjacent to one of the scan lines.

8. The active matrix substrate according to claim 1, further comprising a lower electrode disposed between the substrate and the passivation layer.

9. The active matrix substrate according to claim 8, wherein the lower electrode has a main portion parallel with the scan lines and has a branch overlapped with the second slit.

10. The active matrix substrate according to claim 8, further comprising an upper electrode disposed between the lower electrode and the second slit.

11. The active matrix substrate according to claim 10, wherein the upper electrode is wider than the second slit.

12. The active matrix substrate according to claim 10, wherein the upper electrode is electrically connected with the pixel electrode.

13. The active matrix substrate according to claim 9, wherein the second slit is longer than the branch.

14. The active matrix substrate according to claim 1, wherein the dielectric layer has a taper angle at each side of the second slit.

15. A liquid crystal display, comprising:
    a substrate;
    a plurality of scan lines and a plurality of data lines disposed on the substrate, the data lines crossing the scan lines;
    an active device electrically connected with one of the scan lines and one of the data lines, wherein the active device has a drain electrode;
    a passivation layer covering the scan lines, the data lines, and the active device;
    a pixel electrode electrically connected with the active device through the drain electrode and having a first slit, wherein the first slit is enclosed by the pixel electrode, and the material of the pixel electrode includes indium tin oxide or indium-doped zinc oxide; and a dielectric layer covering the passivation layer and the pixel electrode, wherein the dielectric layer has a second slit unshielding a part of the pixel electrode and contacts the passivation layer through the first slit, the pixel electrode is declineated into a plurality of regions by the second slit, the first slit is disposed in the outmost region of the pixel electrode, and the outmost region is adjacent to one of the scan lines.

16. The liquid crystal display according to claim 15, wherein the first slit and the second slit are inclined with respect to the scan lines and the data lines.

17. The liquid crystal display according to claim 15, further comprising a lower electrode disposed between the substrate and the passivation layer.

18. The liquid crystal display according to claim 15, further comprising an upper electrode disposed between the lower electrode and the second slit.

19. The liquid crystal display according to claim 15, wherein a portion of the pixel electrode is disposed exactly above the drain electrode of the active device.

20. The liquid crystal display according to claim 15, wherein the pixel electrode is disposed within a region surround by the scan line and the data line electrically connected with the active device without being overlapped to the scan lines and the data lines.

\* \* \* \* \*